US009067801B2

(12) United States Patent
Nagghappan (10) Patent No.: US 9,067,801 B2
(45) Date of Patent: *Jun. 30, 2015

(54) METHOD FOR TREATING WASTEWATER OR PRODUCED WATER

(75) Inventor: LNSP Nagghappan, Pittsburgh, PA (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 42 days.

This patent is subject to a terminal disclaimer.

(21) Appl. No.: 12/904,286

(22) Filed: Oct. 14, 2010

(65) Prior Publication Data

US 2011/0023715 A1 Feb. 3, 2011

Related U.S. Application Data

(63) Continuation of application No. 11/609,659, filed on Dec. 12, 2006, now Pat. No. 7,815,804.

(51) Int. Cl.
*C02F 9/04* (2006.01)
*C02F 9/00* (2006.01)
(Continued)

(52) U.S. Cl.
CPC ... *C02F 9/00* (2013.01); *C02F 1/20* (2013.01); *C02F 1/42* (2013.01); *C02F 1/441* (2013.01); *C02F 1/444* (2013.01); *C02F 1/5236* (2013.01); (Continued)

(58) Field of Classification Search
CPC ........................................................ B01D 1/022
USPC ........................................................ 210/638
See application file for complete search history.

(56) References Cited

U.S. PATENT DOCUMENTS 4,462,713 A 7/1984 Zurcher et al.
4,539,120 A 9/1985 Robinson
(Continued)

FOREIGN PATENT DOCUMENTS

JP 09-122690 5/1997
JP 11-104696 4/1999

OTHER PUBLICATIONS

Vandeventer, Larry W., Ford, Bruce R., Vera, Michael W., Innovative Processes Provide Cogeneration Power Plant with the Ability to Utilize Oil Field Water, 50th Annual Meeting International Water Conference, Pittsburgh, PA, Oct. 23-25, 1989, pp. 1-7.
(Continued)

*Primary Examiner* — Topny G Soohoo
*Assistant Examiner* — Peter Keyworth
(74) *Attorney, Agent, or Firm* — Coats and Bennett, PLLC (57) ABSTRACT

A method or process for treating wastewater containing high organics, silica, boron, hardness, and suspended and dissolved solids. The method includes degasifying the wastewater for the removal of dissolved gases and thereafter chemically softening the wastewater. After the chemical softening step, the wastewater is directed through a media filter or membrane which removes additional solids and precipitants. Thereafter the wastewater is directed through a sodium ion exchange that further softens the wastewater. The effluent from the ion exchange is directed through a cartridge filter and the effluent from the cartridge filter is directed through one or more reverse osmosis units. At a selected phase of the process, prior to the wastewater reaching the reverse osmosis unit or units, the pH of the wastewater is raised and maintained such that the pH of the wastewater reaching a reverse osmosis unit is at a pH greater than 10.5.

24 Claims, 4 Drawing Sheets (51) Int. Cl.
*B01D 61/02* (2006.01)
*C02F 1/20* (2006.01)
*C02F 1/42* (2006.01)
*C02F 1/44* (2006.01)
*C02F 1/52* (2006.01)
*C02F 1/56* (2006.01)
*C02F 5/06* (2006.01)
*C02F 103/10* (2006.01)
*C02F 103/36* (2006.01)
*C02F 1/66* (2006.01)

(52) U.S. Cl.
CPC ... *C02F 1/56* (2013.01); *C02F 5/06* (2013.01); *C02F 2103/10* (2013.01); *C02F 2103/365* (2013.01); *C02F 2209/06* (2013.01); *C02F 1/66* (2013.01); *B01D 61/022* (2013.01); *B01D 61/025* (2013.01); *B01D 2317/025* (2013.01)

(56) References Cited

U.S. PATENT DOCUMENTS

| | | | |
|---|---|---|---|
| 5,174,901 A | 12/1992 | Smith | |
| 5,266,210 A | 11/1993 | McLaughlin | |
| 5,573,662 A | 11/1996 | Abe et al. | |
| 5,609,765 A | 3/1997 | Bowman | |
| 5,871,648 A | 2/1999 | Allen et al. | |
| 5,879,562 A | 3/1999 | Garbutt | |
| 6,059,974 A | 5/2000 | Scheurman | |
| 6,113,797 A | 9/2000 | Al-Samadi | |
| 6,267,891 B1 | 7/2001 | Tonelli | |
| 6,296,773 B1 | 10/2001 | McMullen | |
| 6,372,143 B1 | 4/2002 | Bradley | |
| 6,440,310 B1 | 8/2002 | Shorr | |
| 6,582,605 B2 | 6/2003 | Krulik et al. | |
| 6,919,031 B2 | 7/2005 | Blumenschein | |
| 7,048,852 B2 | 5/2006 | Ballard | |
| 7,438,129 B2 | 10/2008 | Heins | |
| 7,520,993 B1 | 4/2009 | Laraway | |
| 7,815,804 B2 * | 10/2010 | Nagghappan | 210/638 |

OTHER PUBLICATIONS

Tao, F.T., Curtice, Stanley, Hobbs, R.D., Sides, J.L., Weiser, J.D., Dyke, C.A., Tuohey, David, Pilfer, P.F., "Conversion of Oilfield Produced Water Into an Irrigation/Drinking Quality Water," Society of Petroleum Engineers, Inc., 1993, pp. 571-578.

Bradley, Bob, "Pilot Testing High Efficiency Reverse Osmosis on Gas Well Produced Water," Hydrometrics, Incorporated, Houston, Texas, 5 pages.

Funston, Roger, Ganesh, Rajagopalan, Leong, Lawrence Y.C., "Evaluation of Technical and Economic Feasibility of Treating Oilfield Produced Water to Create a "New" Water Resource," pp. 1-14.

* cited by examiner

METHOD FOR TREATING WASTEWATER OR PRODUCED WATER

This is a continuation of U.S. patent application Ser. No. 11/609,659 filed Dec. 12, 2006-now U.S. Pat. No. 7,815,804. The disclosure of this patent application is incorporated herein by reference.

BACKGROUND OF THE INVENTION

Numerous types of wastewater or produced water have relatively high concentrations of organics, silica, boron, hardness, suspended and dissolved solids. For example, oil recovery operations produce water that includes high concentrations of these contaminants. If such wastewater or produced water is to be used in high purity applications, such as a feed to a boiler or once through a steam generator or process water, then there must be a substantial reduction in silica, total hardness, dissolved solids and organics.

Ion exchange processes and reverse osmosis processes have been used for desalting produced water or wastewater. Current practices involving the operation of reverse osmosis systems usually maintain a neutral pH condition, which is a pH of approximately 6-8. In the case of feed water produced by oil and gas operations, the recovery across reverse osmosis systems is often limited by scaling due to silica or fouling due to organics. That is, high concentrations of silica in the feed water tend to scale the reverse osmosis membranes due to the concentration of silica exceeding solubility limits. Organics that exceed solubility limits also tend to foul the reverse osmosis membranes. Scaling due to silica and fouling due to organics can cause substantial down time of the reverse osmosis unit or units, requiring frequent cleaning, replacement and maintenance. The maintenance is obviously expensive and the down time is costly and inefficient.

In addition, in the case of produced water, for example, processes are designed to remove silica and boron. These contaminants are often present in the form of weakly ionized salts, sicilic acid and boric acid, and generally reverse osmosis membranes are not efficient in rejecting such weakly ionized salts.

Therefore, there has been and continues to be a need for an economical process for treating wastewater or produced water that reduces fouling due to organics, reduces scaling due to silica, and which will efficiently reduce the concentrations of silica, organics, dissolved solids and hardness in the wastewater or produced water.

SUMMARY OF THE INVENTION

The present invention entails a method or process for treating produced water or wastewater utilizing reverse osmosis units to remove hardness, silica, dissolved and suspended solids and boron, and which maintains the pH of the produced water or wastewater entering the reverse osmosis unit to above 10.5.

In one embodiment, the present invention entails directing feed water (wastewater or produced water) through a chemical softening process that reduces hardness, reduces the concentration of silica and soluble metals, and removes at least some of the suspended solids. During the chemical softening process, one or more alkaline reagents are added to the feed water for the purpose of raising the pH to above 10.5. After being subjected to chemical softening, the feed water is subjected to additional filtration and further softening through one or more ion exchange units. After the additional filtration and softening, the feed water having a pH above 10.5 is directed through one or more reverse osmosis units. The one or more reverse osmosis units are effective to substantially reduce the total dissolved solids, boron, and silica in the feed water.

A further object of the present invention is to provide a system for treating wastewater that includes a chemical softening unit or subsystem having a series of reactors and a clarifier. Associated with one or more of the reactors is a series of injection lines for injection a coagulant, one or more alkaline reagents, and a polymer. Disposed downstream from the reactors and the clarifier are one or more filtration units and one or more ion exchange units for further filtering the feed water and further reducing the hardness of the feed water.

Other objects and advantages of the present invention will become apparent and obvious from a study of the following description and the accompanying drawings which are merely illustrative of such invention.

DESCRIPTION OF THE INVENTION

The present invention relates to a wastewater treatment process for treating wastewater or producing water that contains organics, silica, boron, dissolved solids and suspended solids. Various types and forms of wastewater may contain these contaminants. For example, in the petroleum industry, produced water discharged from oil recovery operations typically includes these contaminants. Treatment of such produced water to meet government discharge regulations is challenging. As used herein the term "wastewater" broadly means an aqueous stream that includes contaminants to be renewed by treatment, and includes, for example, produced water, surface water and well water.

As described subsequently herein, the process of the present invention entails chemically softening and clarifying the wastewater in a process that removes hardness, and through a clarifier, removing suspended solids and precipitants. There after the wastewater is subjected to further filtration and softening. Finally, the treated and conditioned wastewater is directed through one or more reverse osmosis units. To prevent scaling and fouling of the membranes of the reverse osmosis units, the pH of the wastewater is controlled and maintained above 10.5.

Figure 1:
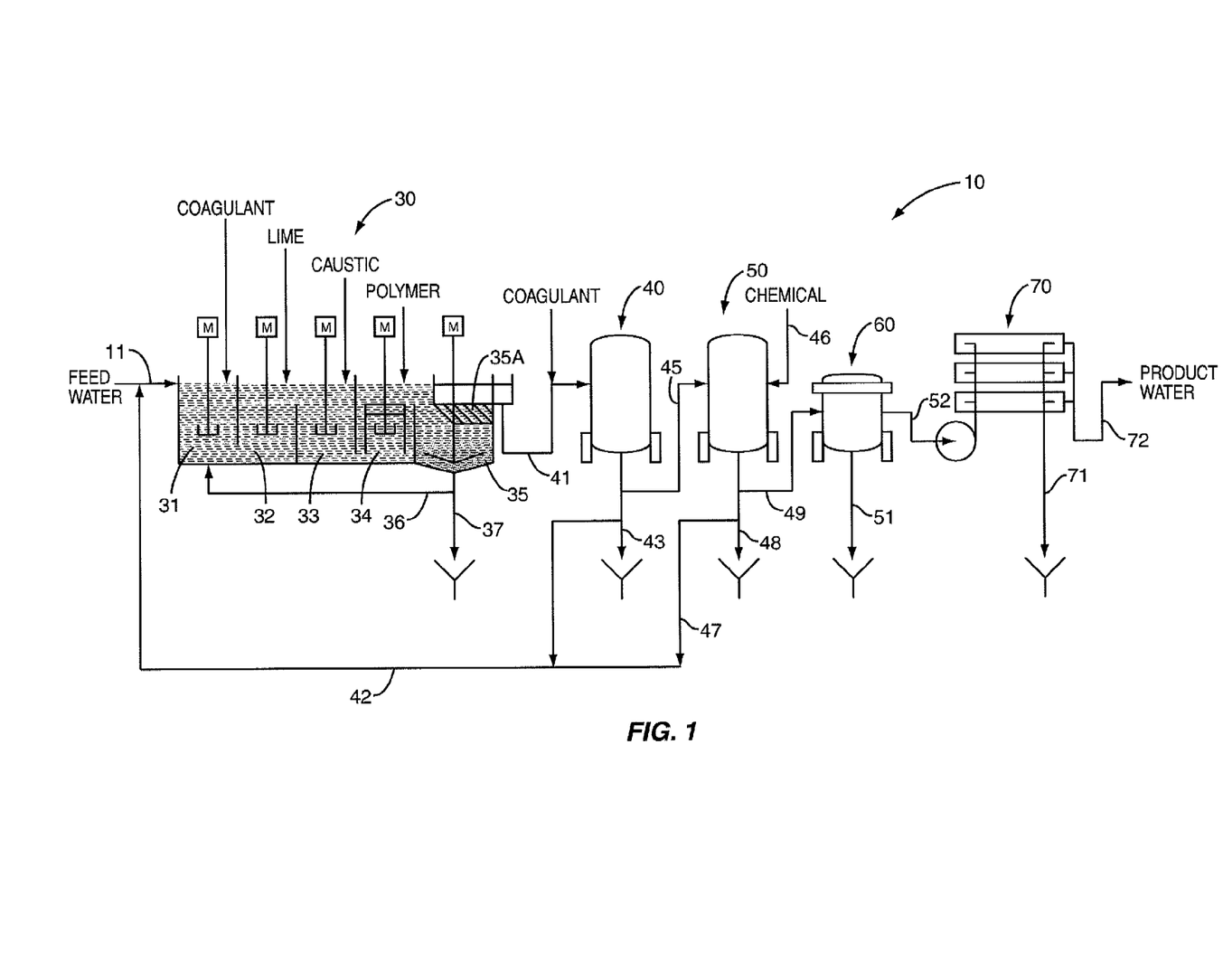
FIG. 1 is a schematic illustration of the process of the present invention

Turning to FIG. 1, the wastewater treatment system of the present invention is shown therein and indicated generally by the numeral 10. The system includes a chemical softening unit 30, a multimedia filtration unit 40, an ion exchange filtration unit 50, a cartridge filtration unit 60, and at least one single pass reverse osmosis unit 70.

Forming a part of the chemical softening unit 30 is a series of reactors 31, 32, 33 and 34, and a clarifier 35. Each of the reactors 31, 32, 33 and 34 include a mixer. Clarifier 35 disposed downstream from the reactors 31, 32, 33 and 34 is of a conventional design, and in the embodiment illustrated herein, includes a settling tank with lamella or separating plates and a bottom scraper. A return sludge line 36 extends from the clarifier 35 to the first reactor 31 or second reactor 32. A waste sludge line 37 also extends from the clarifier 35.

Extending between the clarifier 35 and the multimedia filter 40 is a connecting line 41. Clarified effluent from the clarifier 35 is directed through line 41 to the multimedia filter 40. As seen in FIG. 1, a coagulant injection site can be provided in line 41. In some cases, it may be desirable to inject and mix a coagulant with the wastewater passing in line 41.

Various types of media filters can be utilized. For example, a membrane filtration unit, which could be ultra filtration or micro filtration, could be used. In the case of the embodiment illustrated herein it is contemplated that the multimedia filter 40 would be utilized which would employ layers of anthracite, sand and garnet to remove suspended solids and precipitants in the wastewater passing through the filter. As will be appreciated from subsequent portions of this disclosure, a waste stream will be produced by the multimedia filter 40 and this waste stream will be recycled through return line 42 to be mixed with the influent feed water that is directed through line 11 into the chemical softening unit 30. In addition, extending from the multimedia filter 40 is a waste line 43 that discharges at least some of the waste stream or sludge expelled form the multimedia filter 40.

Extending from the multimedia filter 40 to the ion exchange unit 50 is a connecting line 45. Purified effluent leaving the multimedia filter 40 is directed through line 45 to the ion exchange unit 50. Ion exchange unit 50 includes a chemical inlet line 46 for regeneration of the Ion Exchange Resin upon exhaustion and a return recyclable waste line 47. The recyclable portion of the regeneration waste is recycled to the chemical softening unit. There will be non-recyclable waste leaving the Ion Exchange softener via line 48.

Connected between the ion exchange unit 50 and the cartridge filter 60 is another connecting line 49. Treated or purified effluent from the ion exchange unit 50 is directed through line 49 to the cartridge filter 60. Cartridge filter 60 further filters the wastewater and produces a waste or contaminant stream that is discharged through line 51. An antiscalant or dispersant is added ahead of the cartridge filter 60 to provide a soluble chemical equilibrium for the scale forming compounds across the reverse osmosis unit 20.

Connected between cartridge filter 60 and the reverse osmosis unit 70 is a connecting line 52. Treated or purified effluent from the cartridge filter 60 is directed through line 52 to the reverse osmosis unit 70. Reverse osmosis unit 70 produces a treated effluent or product water that is directed from reverse osmosis unit 70 through line 72 to a discharge area or to a point where the treated wastewater is subjected to additional treatment. Leading from the reverse osmosis unit 70 is a reject line 71 that discharges a reject stream produced by the reverse osmosis unit 70.

With reference to FIG. 1 and the process described therein, a feed water or wastewater influent is directed through line 11 to the chemical softening unit 30. In this embodiment, a coagulant is mixed with the feed water in reactor 31. The coagulant acts to destabilize the solids generated during the softening process and further facilitates or enhances the separation of solids from the liquid in subsequent portions of the process. Various coagulants can be used. Typical coagulants which are utilized are ferric chloride, aluminum sulfate, polyaluminum chloride, and ferrous or ferric sulfate. Dosage may vary depending on the nature and characteristics of the feed water, but in many cases, the dosage will vary in the range of 10-50 mg/l.

After the coagulant has been mixed with the feed water in reactor 31, the feed water is directed down stream to reactors 32 and 33. In one embodiment, lime is added to the feed water in reactor 32 and caustic is added to the feed water in reactor 33. Both the lime and caustic are mixed with the feed water. Lime converts carbon dioxide to bicarbonate ions and also neutralizes the bicarbonate alkalinity of the feed water and removes calcium carbonate hardness compounds from the feed water. The caustic removes magnesium hardness present in the feed water and raises the pH of the feed water. The pH of the feed water is raised to above 10.5. In many cases it is preferable to maintain the pH of the feed water in the range of 10.5 to 11.5. The significance of this pH control will be subsequently addressed herein. Dosage of both the lime and caustic depends on the alkalinity of the feed water. In typical cases lime will be added at the rate of about 100-300 mg/I and the caustic will be added at the rate of 300-500 mg/I. Other alkaline reagents such as magnesium oxide and sodium carbonate can be used. In some cases lime, magnesium oxide, and caustic can be added to the feed water. In other cases lime, soda ash and caustic are added to the feed water. For low alkalinity applications it may be desirable to add soda ash in reactor 32, for example, to remove calcium non-carbonate hardness present in the feed water.

In reactor 34 a polymer is injected and mixed with the feed water. A typical polymer utilized is a cationic polymer. However, an anionic polymer can also be used in wastewater treatment applications depending on the nature of the solids contained in the wastewater. A typical dosage for the polymer would be about 2-5 mg/l. In reactor 34 where the polymer is added, many of the contaminants of interest will be in a precipitated form and because of the coagulant and polymer, these precipitants and solids will tend to aggregate and form flocs.

Figure 1A:
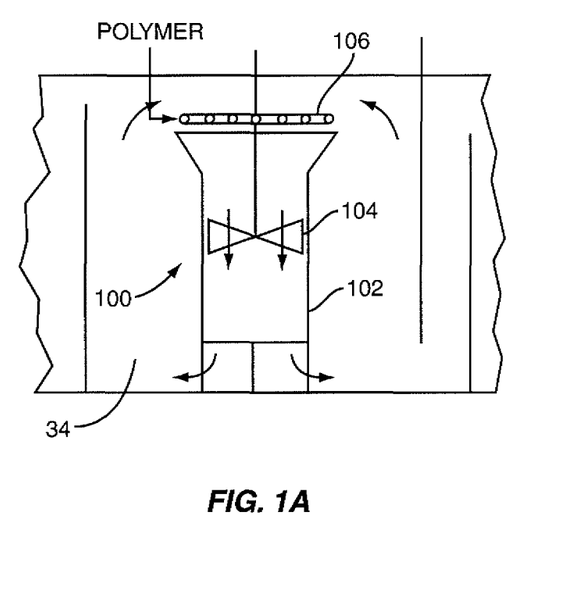
FIG. 1A illustrates the use of a vertical tube mixer in the process of the present invention.

Disposed in reactor 34, in one embodiment, is a vertical draft tube type mixer 100 that promotes the efficient formation of flocs comprised of precipitants and suspended solids, and accordingly gives rise to crystallization and densification of these solids. With reference to FIG. 1A, the vertical draft tube mixer 100 is shown therein. The draft tube mixer 100 includes a tube 102 that is flared at the top and includes opposed open ends. Disposed internally within the tube 102 is a driven mixer 104. Disposed above the top portion of the tube 102 is an annular feed ring 106. As illustrated in FIG. 1A, the polymer or flocculant is fed into the annular ring 106 and the annular ring disperses the polymer or flocculant therefrom over the tube 102. In the case of the embodiment shown in FIG. 1A, the mixer is referred to as a down draft tube type mixer because the waste water is moved from the top of the tube 102 downwardly through the tube. Note that as illustrated with the arrows in FIG. 1A, the wastewater is continually circulated down through the tube 102 and back up outside of the tube to where the wastewater renters the top portion of the tube 102. This efficiently mixes the polymer or flocculant with the wastewater in reactor 34. The flow of wastewater through the tube 102 can be controlled and regulated so as to control the concentration of the polymer or flocculant added.

From reactor 34, the feed water is directed into clarifier 35. The clarifier 35 comprises a settling tank, and in this embodiment, disposed over the settling tank is lamella 35A. Formed in the bottom of the settling tank is a sludge scraper. Once the feed water reaches the setting tank of the clarifier 35, solids in the form of precipitants and suspended solids will settle to the bottom of the settling tank to form a concentrated feedwater stream known as sludge. Sludge is pumped from the bottom of the settling tank of the clarifier 35, with some sludge being directed through recycle line 36 back to the first reactor 31 or 32, while some portion of the sludge can be wasted through waste line 37. The characteristics of the produced sludge is dependent on the characteristics of the feed water being treated, such as hardness, the metals contained in the feed water, and the alkalinity of the feed water. Typically in a process treating feed water from an oil producing operation, the sludge will be about 60% to 70% calcium carbonate, about 20% magnesium hydroxide, and about 10% metal hydroxide compositions. Recirculation rates can vary. However, generally, at least about 5% to 10% of the feed water flow is recycled as sludge. It is contemplated that sufficient sludge is recycled to maintain approximately a 1 to 20 ratio of the dry solids generated. For example, if the process generates 600 mg/l dry solids by precipitation, sludge from the clarifier 35 would be recycled so as to maintain about 6,000 to 12,000 mg/l of total suspended solids (TSS) in the clarifier 35. As with conventional wastewater treatment processes, some of the sludge would be deemed waste sludge and directed to further processing. In this regard the waste sludge exiting line 37 would be typically directed to a dewatering station where the sludge would be dewatered such that the dewatered sludge concentration would typically be above 35% by weight.

The purpose of the chemical softening process described above, and which takes place in reactors 31, 32, 33 and 34 and the clarifier 35, is to substantially reduce total hardness in the feed water to solubility limits, expressed, typically, as less than approximately 55 mg/l as $CaCO_3$. Further, the softening process will, in many instances, partially remove silica. Additionally, the softening process will reduce the concentrations of soluble metals such as iron, magnesium, barium, strontium and other particulates present in the feed water.

Appearing below under Table 1 is a summary of data collected from preliminary tests. Note that total hardness (expressed as $CaCO_3$) was reduced in the chemical softening process from 2100 mg/l to less than 20 mg/l. Thus, a majority of the hardness was removed from the feedwater through the chemical softening process. In addition, silica was reduced from 100 mg/l to 20 mg/l and the total suspended solids (TSS) were reduced from 48 mg/l to less than 20 mg/l. Importantly, pH in the chemical softening process was raised from 7.5 to 11.4.

the down draft tube mixer and the clarifier with lamella substantially increases the settling speed within the clarifier compared to conventional clarification systems.

Clarified effluent leaving the clarifier 35 is directed through line 41 to the multimedia filter 40. Optionally a coagulant can be injected into the wastewater stream passing through line 41 prior to entry into the multimedia filter. The purpose of the filter is to further filter the feed water and to remove suspended and undissolved solids from wastewater. The function of the multimedia filter 40 is to reduce the feed water total suspended solids to less than 0.5 mg/l. Multimedia filter 40 is periodically backwashed with filtered water to clean the same. This backwash or waste stream is directed through line 42 to the inlet line 11 where the same is mixed with the feed water being directed into the water softening unit 30.

Purified effluent from the multimedia filter 40 is directed through line 45 to the ion exchange unit 50. The function of the ion exchange unit is to further reduce the total hardness of the wastewater and to reduce the concentration of other soluble metals present in the wastewater. In the ion exchange unit 50, calcium and magnesium ions are removed through a process that employs a weak acid or strong acid cation resin in a sodium form. The recyclable waste from the ion exchange unit 50, such as backwash/compaction and fast rinse wastes, is directed through line 47 and line 42 back to the feed line 11 where the waste is mixed with the influent feed water stream. Again, portions of the waste, non-recyclable waste, from the ion exchange unit 50 such spent regenerant waste and slow rinse waste is disposed.

The ion exchange softened water is directed from the ion exchange unit 50 through line 49 to one or more cartridge filters 60 to remove any fine particulates present in the feed water. An antiscalant or dispersant is added ahead of the cartridge filter to maintain a soluble chemical equilibrium across the downstream RO unit. Influent from the cartridge filter 60 is directed to a single pass reverse osmosis unit 70. Reverse osmosis unit 70 reduces organics, silica, boron, and total dissolved solids present in the wastewater.

Referring to Table 1, total hardness of the feed water is further reduced to less than approximately 0.5 mg/l ($CaCO_3$) in the ion exchange unit 50. Total alkalinity of the feed water

TABLE 1

| Criterion | Units | Feed Water | Chemical Softening Outlet | Filter Outlet | Ion Exchange Outlet | Cartridge Filter Outlet | RO Outlet |
|---|---|---|---|---|---|---|---|
| T. Hardness | $CaCO_3$ Mg/l | 2,100 | <20 | <20 | <0.5 | <0.5 | — |
| T. Alkalinity | $CaCO_3$ Mg/l | 600 | 1,600 | 1,600 | 1,600 | 1,600 | 68 |
| Silica | Mg/l | 100 | 20 | 20 | 20 | 20 | <0.5 |
| Boron | Mg/l | 2.6 | 2.6 | 2.6 | 2.6 | 2.6 | <0.1 |
| Organics | Mg/l | 32 | 25 | 25 | 25 | 25 | <0.5 |
| TDS | Mg/l | 17,000 | 17,200 | 17,200 | 17,200 | 17,200 | <150 |
| TSS | Mg/l | 48 | <20 | <0.2 | <0.2 | <0.1 | — |
| pH | S·U | 7.5 | 11.4 | 11.4 | 11.4 | 11.4 | 10.7 |

The chemical softening unit 30 is effective in reducing total hardness and reducing the concentration of other contaminants for several reasons. First, the reactors 31, 32, 33 and 34 are, in a preferred embodiment, integrated with the clarifier 35. Further, reactor 34, which is disposed immediately upstream from the clarifier and which receives the flocculant, includes a down draft tube mixer that effectively forms flocs made up of precipitants and suspended solids and gives rise to crystallization and densification of these solids. Preferably the clarifier 35 including lamella 35A. All of this including is actually increased during the chemical softening process and remains generally the same until the feed water reaches the reverse osmosis unit 70. There the total alkalinity expressed as mg/l of $CaCO_3$ is reduced to 68. Also, the reverse osmosis unit 70 reduces the silica from 20 mg/l to less than 0.5 mg/l. Note also that the reverse osmosis unit 70 reduces boron from 2.6 mg/l to less than 0.1 mg/l and reduces organics from 25 mg/l to less than 0.5 mg/l. Furthermore, reverse osmosis unit 70 reduces total dissolved solids from 17,200 mg/l to less than 150 mg/l. Product water produced by the reverse osmosis unit 70 has a pH of 10.7. As noted in Table 1, the pH of the wastewater being treated was actually reduced by the reverse osmosis unit 70. This is because the reverse osmosis reject stream would include carbonate and hydroxyl alkalinity that was present in the feed water.

Figure 2:
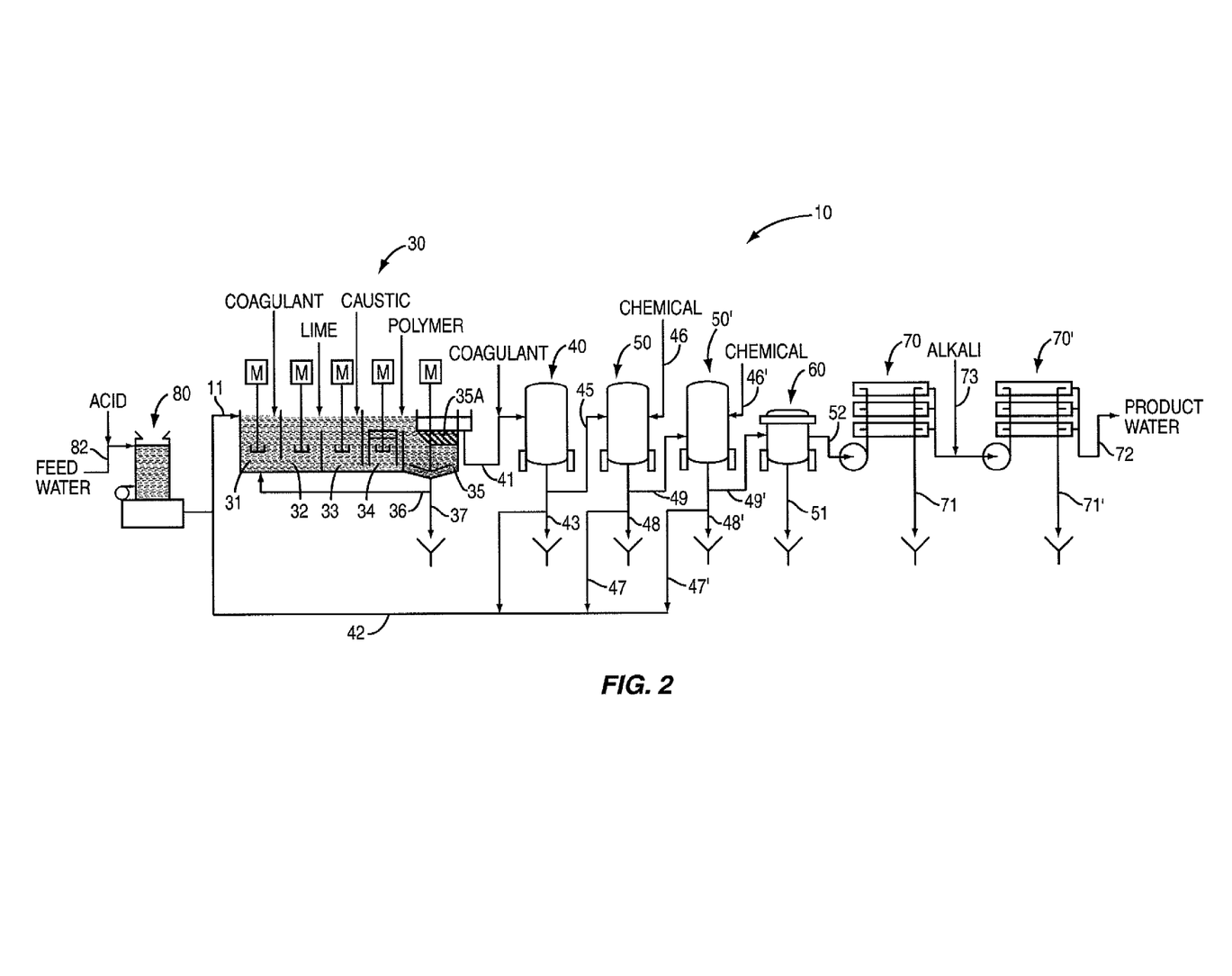
FIG. 2 is a schematic illustration of the wastewater treatment process shown in FIG. 1, but illustrating a number of optional processes.

The system shown in FIG. 1 can be modified to include other subsystems or processes. FIG. 2 illustrates a number of optional subsystems or processes that can be incorporated into the basic process described above. For example, prior to chemically softening the feed water, the feed water can be subjected to a degassing process. As shown in FIG. 2, there is provided a degassing unit, indicated generally by the numeral 80, disposed upstream from the chemical softening unit 30. An acid injection line 82 is provided upstream of the degassing unit 80. As noted above, the degasification process is an optional treatment and is particularly useful for feed waters containing excess alkalinity and dissolved gases. In such cases, an acid is injected through line 82 and mixed with the feed water to partially convert the bicarbonates present in the feed water to carbon dioxide and to maintain hydrogen sulfide or other dissolved gases in a gaseous state. This will effectively adjust the pH of the feed water prior to the degasification process and after the degasification process. In this embodiment, the degasification process will utilize a force draft degasifier or $DO_x$ stripper so as to reduce the carbon dioxide and the hydrogen sulfide present in the feed water. Other types of degasifier such as vacuum or membrane or depurator type can also be used for this application.

Degasification can be performed ahead of the chemical softening process on water with high concentrations of dissolved gases and excess bicarbonate alkalinity with the addition of acid to reduce the quantity of sludge generated and the alkali demand associated with raising the pH in the chemical softening process. Typically, the pH is lowered to a range of 4.5 to 6.5 ahead of the degasifier and the product water from the degasifier is typically in the pH range of 5.0~7.0.

Another option for the system of the present invention is the provision of dual ion exchange units. In FIG. 2, two ion exchange units 50 and 50' are disposed between the multimedia filter 40 and the cartridge filter 60. The use of the double ion exchange units 50 and 50' will serve to further reduce the hardness of the wastewater, and will particularly reduce the magnesium and carbon content of the wastewater passing therethrough. The application of the single or dual ion exchange units is primarily determined by the dissolved solids background of the feed water. The Ion Exchange system can utilize either a Strong Acid Cation Resin in Sodium form or a Weak Acid Cation Resin in Sodium Form.

Finally, in some cases, the system can be provided with dual reverse osmosis (RO) units 70 and 70'. This is illustrated in FIG. 2. In certain cases, due to the nature and characteristics of the feed water, it may be useful to utilize two reverse osmosis units instead of one in order to efficiently remove silica, boron, organics, and total suspended solids. When using the double RO units 70 and 70' a pH adjustment may be required between the two units. Accordingly, line 73 is provided for injecting a caustic into the effluent from the first RO unit 70. The amount of caustic injected is calculated so as to maintain the pH greater than 10.5.

Figure 3:
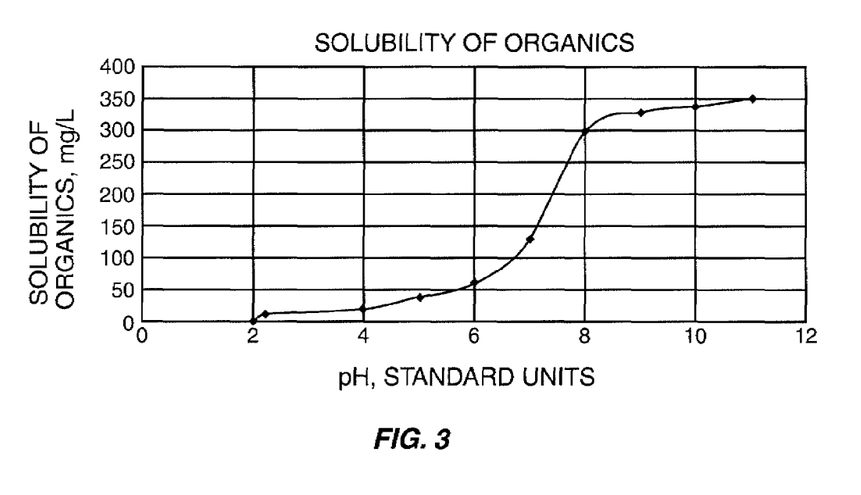
FIG. 3 is a graph showing the relationship between solubility of organics and pH.
Figure 4:
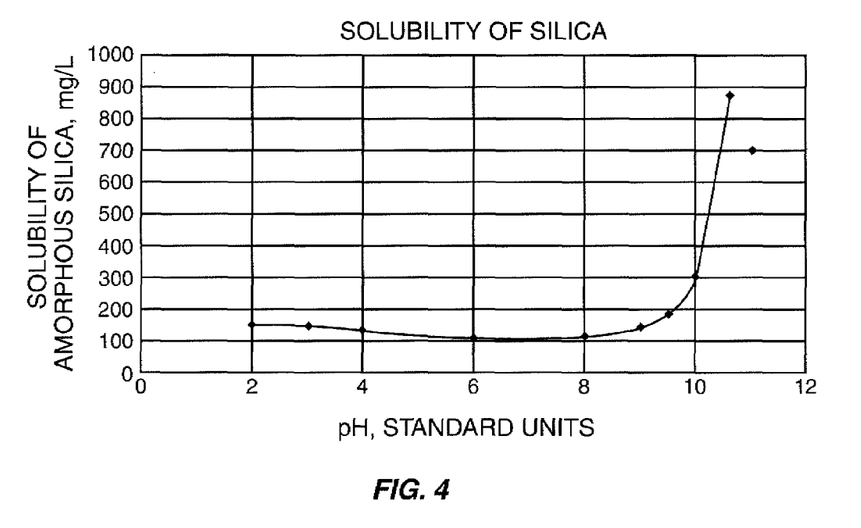
FIG. 4 is a graph showing the relationship between the solubility of silica and pH.

As discussed above, the present process aims to control the pH of the wastewater passing through the one or more reverse osmosis units 70 or 70' at above 10.5. This will substantially reduce organic fouling and silica scaling of the membranes in the reverse osmosis units. As seen in FIG. 3, the solubility of organics generally increases with pH. For example, at a pH over 10 the solubility of organics is approximately 350 mg/l. However, at a pH of 6 the solubility of organics is just above 50 mg/l. The same relationship holds true for the solubility of silica which is shown in FIG. 4. Note that the solubility of silica increases dramatically for pHs above 10. In fact, as shown in FIG. 4, the solubility of silica at a pH of about 10.5 is almost 900 mg/l. That is to be contrasted with the solubility of silica at a pH of 8 which is about 100 mg/l. Thus, by maintaining the pH of the feed water to above 10.5, these scaling and fouling contaminants are maintained in solution and can be rejected by the one or more reverse osmosis units 70 or 70' without scaling and fouling.

What is claimed is:

1. A method of removing hardness, suspended solids and dissolved solids from a feedwater stream by pretreating the feedwater stream and thereafter directing the feedwater stream through at least one reverse osmosis unit, the method comprising:
   a. removing a majority of the hardness from the feedwater stream through a chemical softening process and reducing the concentration of total hardness in the feedwater stream to less than 55 mg/L as $CaCO_3$ during the chemical softening process by:
      i. directing the feedwater stream into one or more reactors;
      ii. mixing a first alkaline reagent with the feedwater stream in the one or more reactors wherein mixing the first alkaline reagent causes hardness compounds to be precipitated from the feedwater stream;
      iii. after mixing the first alkaline reagent with the feedwater stream, directing the feedwater stream to a downstream mixing reactor;
      iv. in the downstream mixing reactor, directing the feedwater stream through a vertical tube mixer and mixing a flocculant with the feedwater stream and continuously circulating the feedwater stream vertically through the vertical tube mixture and forming floc made up of precipitated hardness compounds and suspended solids which gives rise to crystallized solids;
      v. downstream of the mixing chamber, separating the feedwater stream into two streams, a concentrated feedwater stream having the precipitated solids, including hardness compounds and suspended solids, and a clarified feedwater stream having suspended solids, dissolved solids, and residual hardness;
      vi. recycling at least a portion of the concentrated feedwater stream back to at least one of the upstream reactors and mixing the concentrated feedwater stream with the feedwater stream which gives rise to the further formation of floc and crystallized solid in the mixing reactor;
      vii. wasting at least a portion of the concentrated feedwater stream;
   b. prior to separating the feedwater stream into the concentrated feedwater stream and the clarified feedwater stream mixing a second alkaline reagent with the feedwater stream and raising the pH of the feedwater stream to above 10.5;
   c. directing the clarified feedwater stream to a filtering unit and further removing suspended solids from the feedwater stream;
   d. directing the clarified feedwater stream into an ion exchange unit and removing residual hardness from the feedwater stream;
   e. after subjecting the clarified feedwater stream to treatment in the filtering unit and ion exchange unit, directing the clarified feedwater stream to a reverse osmosis unit and removing dissolved solids from the feed stream and producing a permeate stream and a reject stream where the reject stream includes dissolved solids; and f. generally maintaining the pH at above 10.5 such that when the feedwater stream reaches the reverse osmosis unit the pH of the feedwater stream is above 10.5 which reduces the tendency of one or more membranes forming a part of the reverse osmosis unit to scale.

2. The method of claim 1 including degasifying the feedwater stream prior to chemically softening the feedwater stream.

3. The method of claim 1 wherein prior to separating the feedwater stream into the concentrated feedwater stream and the clarified feedwater stream, the method includes substantially increasing total alkalinity of the feedwater stream, and thereafter reducing total alkalinity in the reverse osmosis unit.

4. The method of claim 3 including utilizing the ion exchange unit to reduce the concentration of total hardness to less than 0.5 mg/L $CaCO_3$.

5. The method of claim 1 wherein a coagulant is also mixed with the feedwater stream prior to separating the feedwater stream into the concentrated feedwater stream and the clarified feedwater stream.

6. The method of claim 1 including mixing magnesium oxide or soda ash with the feedwater stream in one or more of the reactors prior to separating the feedwater stream into the concentrated feedwater stream and the clarified feedwater stream.

7. The method of claim 1 including increasing the pH of the feedwater stream to at least 11 or more prior to separating the feedwater stream into the concentrated feedwater stream and the clarified feedwater stream.

8. The method of claim 1 wherein the first alkaline reagent is lime and wherein the second alkaline reagent is a caustic.

9. The method of claim 1 wherein the feedwater stream includes silica and wherein the method further includes precipitating silica from the feedwater stream prior to separating the feedwater stream into the concentrated feedwater stream and the clarified feedwater stream and wherein separating the feedwater stream into the concentrated feedwater stream and the clarified feedwater stream results in the concentrated feedwater stream further including precipitated silica.

10. The method of claim 1 wherein prior to separating the feedwater stream into the concentrated feedwater stream and the clarified feedwater stream, the method includes substantially increasing total alkalinity of the feedwater stream, and thereafter reducing total alkalinity in the feedwater stream in the reverse osmosis unit; and wherein the ion exchange unit reduces the concentration of total hardness to less than 0.5 mg/L $CaCO_3$.

11. The method of claim 10 including mixing magnesium oxide or soda ash with the feedwater stream in one or more of the reactors prior to separating the feedwater stream into the concentrated feedwater stream and the clarified feedwater stream.

12. The method of claim 1 including removing excess bicarbonate alkalinity from the feedwater stream prior to removing hardness from the feedwater stream by adding an acid to the feedwater stream and degassing the feedwater stream before the feedwater stream is subjected to chemical softening.

13. The method of claim 1 including adding an acid to the feedwater prior to the chemical softening process and reducing the pH of the feedwater to a range of 4.5-6.5, and thereafter degassing the feedwater, and after degassing the feedwater, raising the pH of the feedwater to above 10.5 in the chemical softening process.

14. A method of removing hardness, silica, suspended solids and dissolved solids from a feedwater stream by pretreating the feedwater stream and thereafter directing the feedwater stream through at least one reverse osmosis unit, the method comprising:

a. removing a majority of the hardness and reducing the concentration of total hardness in the feedwater stream to less than 55 mg/L as $CaCO_3$ during a chemical softening process and also removing silica from the feedwater stream through the chemical softening process by:
  i. directing the feedwater stream into one or more reactors;
  ii. removing a majority of the hardness from the feedwater stream by mixing a first alkaline reagent with the feedwater stream in the one or more reactors wherein mixing the first alkaline reagent causes hardness compounds to be precipitated from the feedwater stream;
  iii. after mixing the first alkaline reagent with the feedwater stream, directing the feedwater stream to a downstream mixing reactor;
  iv. in the downstream mixing reactor directing the feedwater stream into a vertical tube mixer and mixing a flocculant with the feedwater stream and continuously circulating the feedwater stream vertically through the vertical tube mixer and forming floc made up of precipitated solids including precipitated hardness compounds and suspended solid which gives rise to crystallized solids;
  v. downstream of the mixing reactor, separating the feedwater stream into two streams, a concentrated feedwater stream having the precipitated solids including hardness compounds and suspended solids, and a clarified feedwater stream having suspended solids, dissolved solids, and residual hardness;
  vi. recycling at least a portion of the concentrated feedwater stream back to at least one of the upstream reactors and mixing the concentrated feedwater stream with the feedwater stream which gives rise to the further formation of floc and crystallized solid in the mixing reactor;
  vii. wasting at least a portion of the concentrated feedwater stream;
b. prior to separating the feedwater stream into the concentrated feedwater stream and the clarified feedwater stream, mixing a second alkaline reagent with the feedwater stream and raising the pH of the feedwater stream to above 10.5;
c. directing the clarified feedwater stream to a filtering unit and further removing suspended solids from the feedwater stream;
d. directing the clarified feedwater stream into an ion exchange unit and in the ion exchange unit reducing the concentration of total hardness in the feedwater stream to less than 0.5 mg/L $CaCO_3$;
e. after subjecting the clarified feedwater stream to treatment in the filtering unit and ion exchange unit, directing the clarified feedwater stream to a reverse osmosis unit and removing dissolved solids from the feed stream and producing a permeate stream and a reject stream where the reject stream includes dissolved solids; and
f. generally maintaining the pH at above 10.5 such that when the feedwater stream reaches the reverse osmosis unit the pH of the feedwater stream is above 10.5 which reduces the tendency of one or more membranes forming a part of the reverse osmosis unit to scale.

15. The method of claim 14 wherein prior to separating the feedwater stream into the concentrated feedwater stream and the clarified feedwater stream, the method includes substantially increasing total alkalinity of the feedwater stream, and thereafter reducing total alkalinity in the reverse osmosis unit.

16. The method of claim 14 wherein a coagulant is also mixed with the feedwater stream prior to separating the feedwater stream into the concentrated feedwater stream and the clarified feedwater stream.

17. The method of claim 14 including mixing magnesium oxide or soda ash with the feedwater stream in one or more of the reactors prior to separating the feedwater stream into the concentrated feedwater stream and the clarified feedwater stream.

18. The method of claim 14 including increasing the pH of the feedwater stream to at least 11 or more prior to separating the feedwater stream into the concentrated feedwater stream and the clarified feedwater stream.

19. The method of claim 14 wherein the first alkaline reagent is lime and wherein the second alkaline reagent is a caustic.

20. The method of claim 14 wherein the feedwater stream includes silica and wherein the method further includes precipitating silica from the feedwater stream prior to separating the feedwater stream into the concentrated feedwater stream and the clarified feedwater stream and wherein separating the feedwater stream into the concentrated feedwater stream and the clarified feedwater stream results in the concentrated feedwater stream further including precipitated silica.

21. The method of claim 14 wherein prior to separating the feedwater stream into the concentrated feedwater stream and the clarified feedwater stream, the method includes substantially increasing total alkalinity of the feedwater stream, and thereafter reducing total alkalinity in the feedwater stream in the reverse osmosis unit.

22. The method of claim 21 including mixing magnesium oxide or soda ash with the feedwater stream in one or more of the reactors prior to separating the feedwater stream into the concentrated feedwater stream and the clarified feedwater stream.

23. The method of claim 14 including removing excess bicarbonate alkalinity from the feedwater stream prior to removing hardness from the feedwater stream by adding an acid to the feedwater stream and degassing the feedwater stream before the feedwater stream is subjected to chemical softening.

24. The method of claim 14 including adding an acid to the feedwater prior to the chemical softening process and reducing the pH of the feedwater to a range of 4.5-6.5, and thereafter degassing the feedwater, and after degassing the feedwater, raising the pH of the feedwater to above 10.5 in the chemical softening process.

* * * * *